US011367413B2

(12) United States Patent
Tsubokura et al.

(10) Patent No.: US 11,367,413 B2
(45) Date of Patent: Jun. 21, 2022

(54) DISPLAY DEVICE, METHOD FOR DISPLAYING IMAGE DATA AND MOBILE TERMINAL

(71) Applicant: Panasonic Liquid Crystal Display Co., Ltd., Hyogo (JP)

(72) Inventors: Masaki Tsubokura, Hyogo (JP); Takao Imaoku, Hyogo (JP); Takashi Kato, Shimane (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 17/115,162

(22) Filed: Dec. 8, 2020

(65) Prior Publication Data

US 2021/0241718 A1 Aug. 5, 2021

(30) Foreign Application Priority Data

Feb. 3, 2020 (JP) ............................ JP2020-016465
Feb. 3, 2020 (JP) ............................ JP2020-016466

(51) Int. Cl.

| | |
|---|---|
| ***H04N 1/60*** | (2006.01) |
| ***G09G 5/10*** | (2006.01) |
| ***H04N 5/57*** | (2006.01) |
| ***H04N 9/64*** | (2006.01) |
| ***H04N 9/69*** | (2006.01) |
| ***H04N 9/73*** | (2006.01) |
| ***H04N 9/77*** | (2006.01) |

(52) U.S. Cl.
CPC ......... *G09G 5/10* (2013.01); *G09G 2320/066* (2013.01); *G09G 2320/0673* (2013.01); *G09G 2320/0693* (2013.01); *G09G 2354/00* (2013.01); *G09G 2360/144* (2013.01); *G09G 2380/08* (2013.01)

(58) Field of Classification Search
CPC combination set(s) only.
See application file for complete search history.

(56) References Cited

U.S. PATENT DOCUMENTS

2008/0049005 A1* 2/2008 Okita .................. G09G 3/3648 345/207
2015/0287370 A1* 10/2015 Takanashi ............. G09G 3/342 345/690
2017/0102777 A1* 4/2017 Kato ......................... G06F 3/01
2018/0211630 A1* 7/2018 Kato ................. G02F 1/133621

FOREIGN PATENT DOCUMENTS

JP 2019-103944 6/2019

* cited by examiner

*Primary Examiner* — Wesner Sajous
(74) *Attorney, Agent, or Firm* — Wenderoth, Lind & Ponack, L.L.P.

(57) ABSTRACT

A display device for displaying image data includes: a gradation conversion circuit that converts a gradation of input image data; a display panel that displays the image data with the gradation converted by the gradation conversion circuit; an illuminance sensor that detects illuminance of an environment where the display device is placed; and a gamma characteristic corrector that controls a gradation conversion circuit so as to convert the gradation by use of a gamma characteristic corresponding to the detected illuminance.

7 Claims, 12 Drawing Sheets

8bit + 2bit corrected gradation

| input gradation | output gradation |
|---|---|
| 0 | 0 |
| | 1 |
| | 2 |
| | 3 |
| 1 | 4 |
| | 5 |
| | 6 |
| | 7 |
| 2 | 8 |
| | 9 |
| ⋮ | ⋮ |
| 255 | 1020 |

(a)

digital γ (for GSDF) LUT data

| input gradation | output gradation |
|---|---|
| 0 | 0 |
| 1 | 4 |
| 2 | 10 |
| 3 | 14 |
| 4 | 17 |
| ⋮ | ⋮ |
| 255 | 1020 |

(b)

(c)

(d)

DISPLAY DEVICE, METHOD FOR DISPLAYING IMAGE DATA AND MOBILE TERMINAL

CROSS-REFERENCE TO RELATED APPLICATION

This application claims priority from Japanese application JP 2020-016465, filed on Feb. 3, 2020 and Japanese application JP 2020-016466, filed on Feb. 3, 2020. These Japanese applications are incorporated herein by reference.

TECHNICAL FIELD

The present disclosure relates to a display device, a method for displaying image data and mobile terminal. The present disclosure particularly relates to a display device and the like suitable for displaying a medical image on a mobile terminal.

BACKGROUND

Conventionally, various technologies have been proposed as display devices for image interpretation in which a medical image such as a tomographic image is observed and diagnosed (e.g., see Unexamined Japanese Patent Publication No. 2019-103944). In Unexamined Japanese Patent Publication No. 2019-103944, in order to improve efficiency in image interpretation, graph information on a tomographic image is generated, and a graph marker is superimposed on the graph information.

SUMMARY

However, with an increase in number of diagnoses, a sharp increase in amount of image information, a shortage of doctors, and the need to reform doctors' work styles in recent years, it has been required to be able to interpret images by use of mobile terminals not only at hospitals but also at home and on business trips.

However, regarding display of medical images, a gradation characteristic has been determined by Grayscale Standard Display Function (GSDF) defined in the Digital Imaging and Communications in Medicine (DICOM) standard. At this time, as an index for evaluating whether an image is compliant with GSDF, a contrast-response error rate, which is an error rate between a contrast calculated from ideal GSDF and a measured value, is used. However, the contrast-response error rate fluctuates under the influence of illuminance in an environment where a display device is placed. Hence it is difficult for a display device used in various environments, such as a mobile terminal, to maintain a gradation characteristic compliant with GSDF.

This present disclosure provides a display device and a method for displaying image data that are suitable for displaying a medical image on a mobile terminal.

This present disclosure also provides a mobile terminal and a method for calibrating a mobile terminal that can maintain a gradation characteristic suitable for displaying a medical image.

A display device for displaying image data according to the present disclosure includes: a gradation conversion circuit that converts a gradation of input image data; a display panel that displays the image data with the gradation converted by the gradation conversion circuit; an illuminance sensor that detects illuminance of an environment where the display device is placed; and a gamma characteristic corrector that controls a gradation conversion circuit so as to convert the gradation by use of a gamma characteristic corresponding to the detected illuminance.

A method for displaying image data according to the present disclosure includes: a gradation conversion step of converting a gradation of the image data input into a display device; a display step of displaying the image data with the gradation converted in the gradation conversion step; an illuminance detection step of detecting illuminance of an environment where the display device is placed; and a gamma characteristic correction step of performing control so as to convert the gradation by use of a gamma characteristic corresponding to the detected illuminance.

A mobile terminal according to the present desclosure, includes: a display panel; and an opening and closing unit linked to the display panel so as to be switchable between a first position for exposing a front surface of the display panel and a second position for covering the front surface, wherein the opening and closing unit has at least one luminance sensor that is a luminance sensor attached to a surface of the opening and closing unit facing the front surface when at the second position, and that detects luminance of the front surface.

A method for calibrating the mobile terminal according to the present disclosure includes: a luminance calibration step of performing calibration of a gamma characteristic of the mobile terminal in accordance with the luminance detected by the at least one luminance sensor, wherein in the luminance calibration step, the calibration is performed when the opening and closing unit shifts from the first position to the second position.

DETAILED DESCRIPTION

Figure 1:
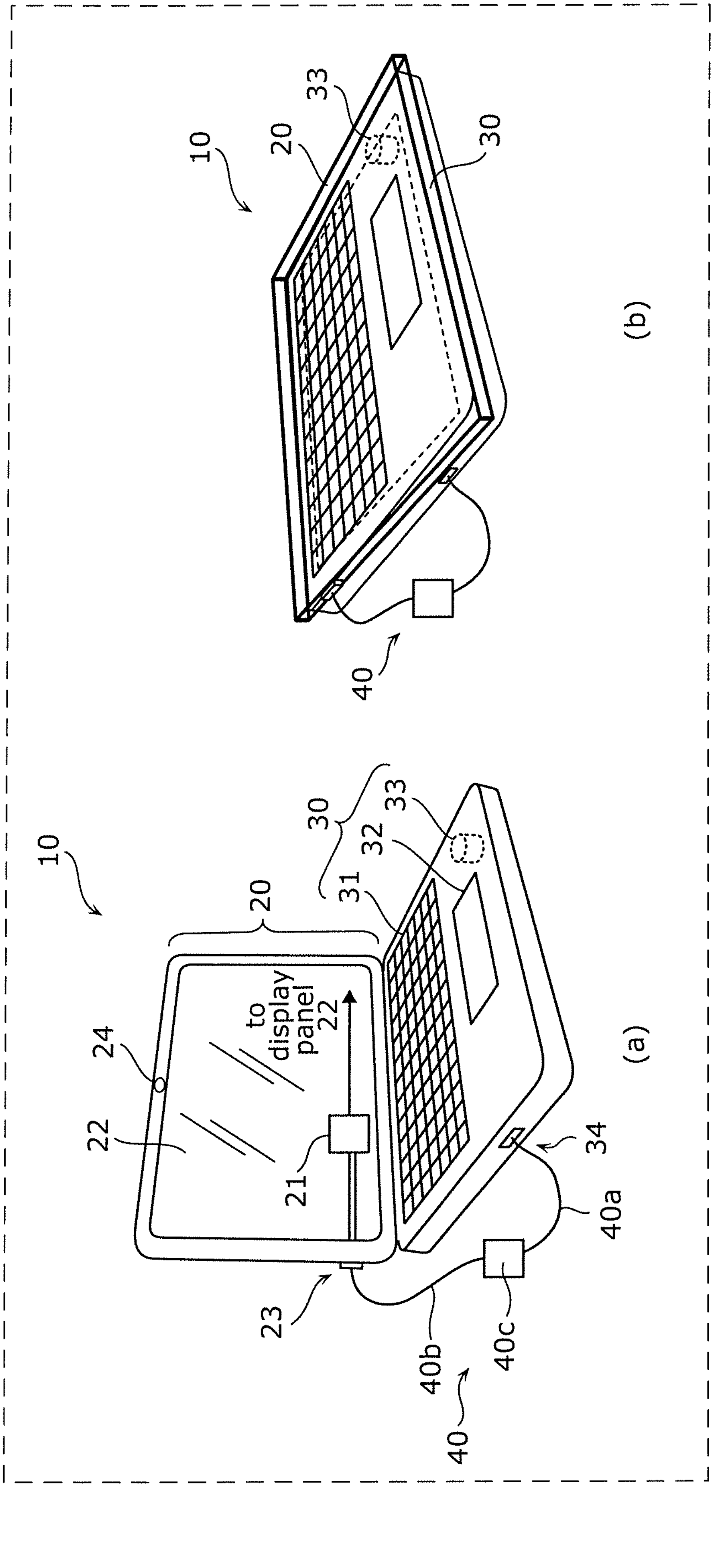
FIG. 1 is external views of a mobile terminal according to an exemplary embodiment.

Hereinafter, exemplary embodiments of the present disclosure will be described in detail with reference to the drawings. Note that each of the exemplary embodiments described below shows a specific example of the present disclosure. Numerical values, shapes, materials, constituent elements, arrangement positions and connection forms of the constituent elements, steps, an order of the steps, and the like shown in the following exemplary embodiments are merely examples, and are not intended to limit the present disclosure. In addition, each drawing is not necessarily strictly illustrated. In each of the drawings, substantially the same configuration is denoted by the same reference numeral, and redundant description may be omitted or simplified.

FIG. 1 is an external view of mobile terminal 10 according to an exemplary embodiment. Part (a) of FIG. 1 illustrates appearance of mobile terminal 10 in a use state, and part (b) of FIG. 1 illustrates the appearance of mobile terminal 10 in a folded state. Mobile terminal 10 is an example of a display device that displays image data such as a medical image, and includes display 20 and terminal body 30 that are achieved based on a notebook personal computer (PC), and conversion module 40.

Display 20 includes display control circuit 21, display panel 22, connector 23, and illuminance sensor 24. Connector 23 is an example of a second connector provided on a housing of display 20 to connect conversion module 40 and display control circuit 21. Display control circuit 21 is a circuit that converts image data input from terminal body 30 into image data suitable for display panel 22 and outputs the image data to display panel 22. In the present exemplary embodiment, in addition to that function, display control circuit 21 internally holds look-up table (LUT) data for GSDF that is an example of a first gamma characteristic transmitted from conversion module 40 (this LUT data is also referred to as "digital γ"), or when receiving an instruction from terminal body 30 or conversion module 40, display control circuit 21 performs gradation conversion on image data input from terminal body 30 in accordance with the internally held LUT data for GSDF. Display panel 22 performs gradation conversion on the image data input from display control circuit 21 with a gamma characteristic having a gamma value of 2.2 (γ2.2), and displays the image data after the gradation conversion. Display panel 22 is, for example, a liquid crystal panel. Illuminance sensor 24 is a sensor that detects illuminance of an environment where mobile terminal 10 is placed and is, for example, a photodiode.

Terminal body 30 is an example of an opening and closing unit movably linked to display panel 22 so as to take a first position for exposing a front surface of display panel 22 and a second position for covering a front surface of display panel 22. Terminal body 30 includes keyboard 31, touch pad 32, luminance sensor 33, universal serial bus (USB) port 34, and constituent elements (not illustrated) as a computer device (a non-volatile memory storing a program, a volatile memory temporarily storing a program and data, a processor that executes a program, an input/output, a communication circuit, etc.). Keyboard 31 and touch pad 32 are examples of an input device that receives an instruction from a user. Luminance sensor 33 is a sensor that is attached to a surface of terminal body 30 facing a front surface of display panel 22 when terminal body 30 as the opening and closing unit is at the second position, and detects luminance of the front surface of display panel 22. Luminance sensor 33 is, for example, a photodiode. USB port 34 is an example of a first connector provided on a housing of terminal body 30 to connect conversion module 40 and terminal body 30.

Conversion module 40 is detachably attached to mobile terminal 10 and includes: control board **40*c* having a conversion circuit that converts data output from USB port 34 of terminal body 30 into inter-integrated circuit (I2C) data, and then outputs the data to display control circuit 21 via connector 23; USB cable 40*a* that connects USB port 34 of terminal body 30 to control board 40*c*; and I2C cable 40*b* that connects control board 40*c* and connector 23. Note that conversion module 40 may not only be externally attached to mobile terminal 10 as in the present exemplary embodiment but may also be detachably built in mobile terminal 10. For example, conversion module 40 (in particular, control board 40*c*) may be built in mobile terminal 10 in such a manner that a memory or an extension board is added to an inside of mobile terminal 10**.

Figure 2:
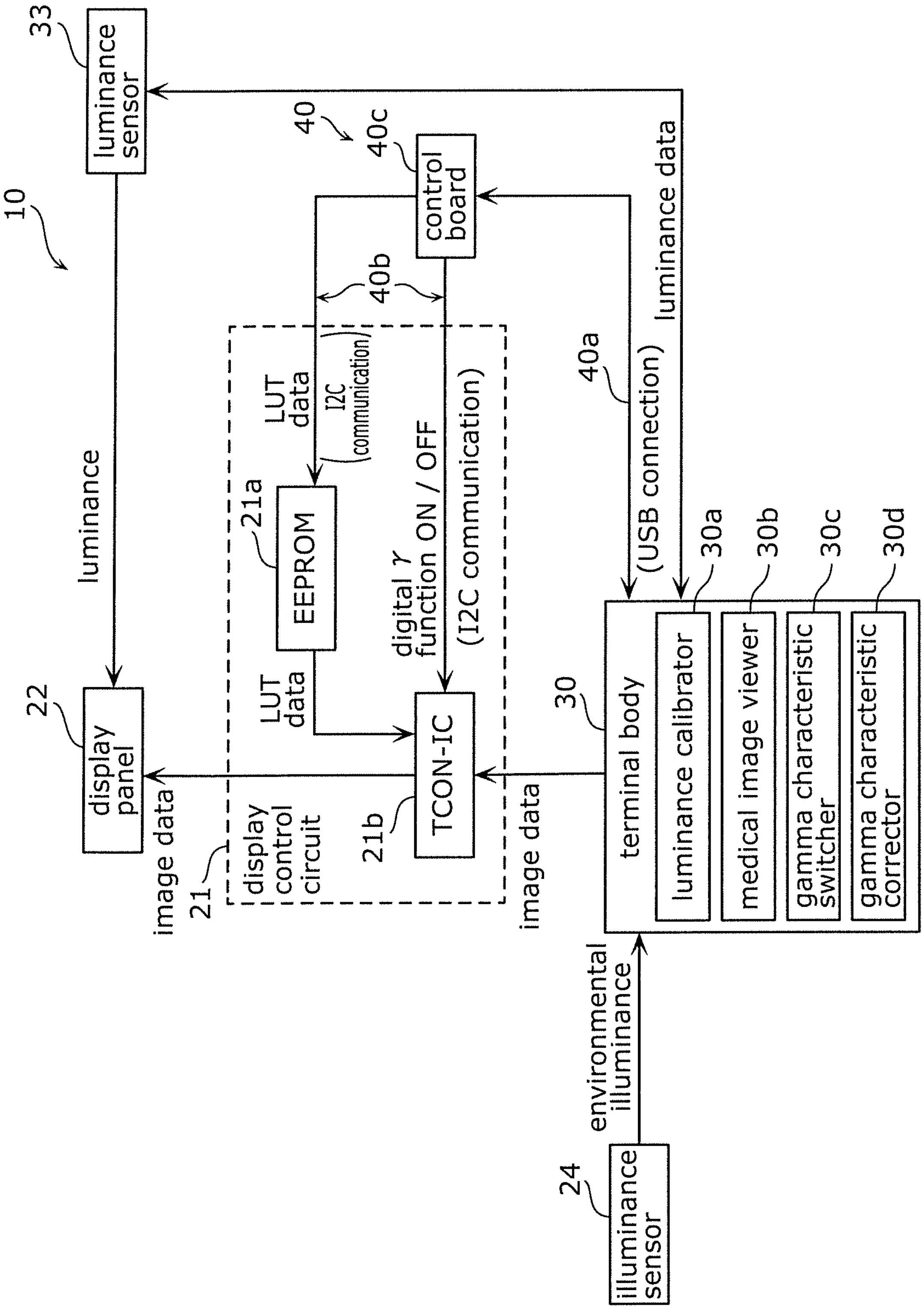
FIG. 2 is a block diagram illustrating a detailed configuration of the mobile terminal according to the exemplary embodiment.

FIG. 2 is a block diagram illustrating a detailed configuration of mobile terminal 10 according to the present exemplary embodiment illustrated in FIG. 1.

Luminance sensor 33 outputs the detected luminance of display panel 22 to terminal body 30.

Illuminance sensor 24 outputs the detected illuminance of the environment to terminal body 30.

Display control circuit 21 includes electrically erasable programmable read-only memory (EEPROM) **21*a* and timing controller (TCON) 21*b*. EEPROM 21*a* is an example of a storage circuit that holds LUT data for GSDF transmitted from conversion module 40 by I2C communication. TCON 21*b* is an example of a gradation conversion circuit that performs gradation conversion on the image data input from terminal body 30 in accordance with LUT data for GSDF held in EEPROM 21*a* when receiving an instruction from terminal body 30 or an instruction by I2C communication from conversion module 40 ("digital γ function ON"). In the present exemplary embodiment, in addition to that function, TCON 21*b* converts the image data input from terminal body 30 into image data containing a synchronizing signal of display timing and outputs the image data to display panel 22**.

Terminal body 30 includes luminance calibrator **30*a*, medical image viewer 30*b*, gamma characteristic switcher 30*c*, and gamma characteristic corrector 30*d*** as functional constituent elements achieved by the processor executing a program.

Luminance calibrator **30*a* generates LUT data indicating a gamma characteristic for GSDF by performing luminance calibration in accordance with the luminance detected by luminance sensor 33, and writes the generated LUT data to EEPROM 21*a* via conversion module 40. Note that the LUT data written in EEPROM 21*a* is read into an internal memory of TCON 21*b* when a power of TCON 21*b* is turned ON/OFF, and TCON 21*b* converts the gradation of the image data in accordance with the LUT data read into the internal memory. Luminance calibrator 30*a* automatically performs luminance calibration when terminal body 30** shifts from the first position to the second position.

Medical image viewer **30*b* causes display panel 22 to display a medical image stored in an auxiliary storage unit (not illustrated) or the like of terminal body 30 in accordance with an instruction from the user using keyboard 31 and touch pad 32**.

Gamma characteristic switcher 30*c* provides TCON 21*b* with the instruction from terminal body 30 or the instruction by I2C communication via conversion module 40 to the TCON 21*b* ("digital γ function ON/OFF"), thereby controlling TCON 21*b* so as to perform or not perform gradation conversion on the image data input from terminal body 30 in accordance with LUT data for GSDF held in EEPROM 21*a*. When medical image viewer 30*b* starts up, gamma characteristic switcher 30*c* instructs "digital γ function ON" to TCON 21*b*, thus enabling the gradation conversion in accordance with the LUT data for GSDF.

Gamma characteristic corrector 30*d* controls TCON 21*b* so as to perform gradation conversion by use of the gamma characteristic for GSDF corresponding to the illuminance detected by illuminance sensor 24. Note that the gamma characteristic (LUT data) for GSDF corresponding to the illuminance detected by illuminance sensor 24 is also referred to as a "second gamma characteristic." Here, the second gamma characteristic is a gamma characteristic for GSDF that defines correspondence between the gradation indicated by the input image data and the luminance of display panel 22. The second gamma characteristic is a gamma characteristic for correcting the gamma characteristic of display panel 22 so as to reduce the influence of the illuminance detected by illuminance sensor 24 on contrast of display panel 22. That is, the second gamma characteristic is a gamma characteristic for GSDF corresponding to environmental illuminance on a premise of display on display panel 22 in accordance with γ2.2 (i.e., based on γ2.2). When power is supplied to illuminance sensor 24, or when a structure (here, terminal body 30) covering illuminance sensor 24 is removed and illuminance sensor 24 is exposed, gamma characteristic corrector 30*d* controls TCON 21*b* so as to convert the gradation of the image data in accordance with the second gamma characteristic.

Next, an operation of mobile terminal 10 according to the present exemplary embodiment configured as described above will be described.

Figure 3:
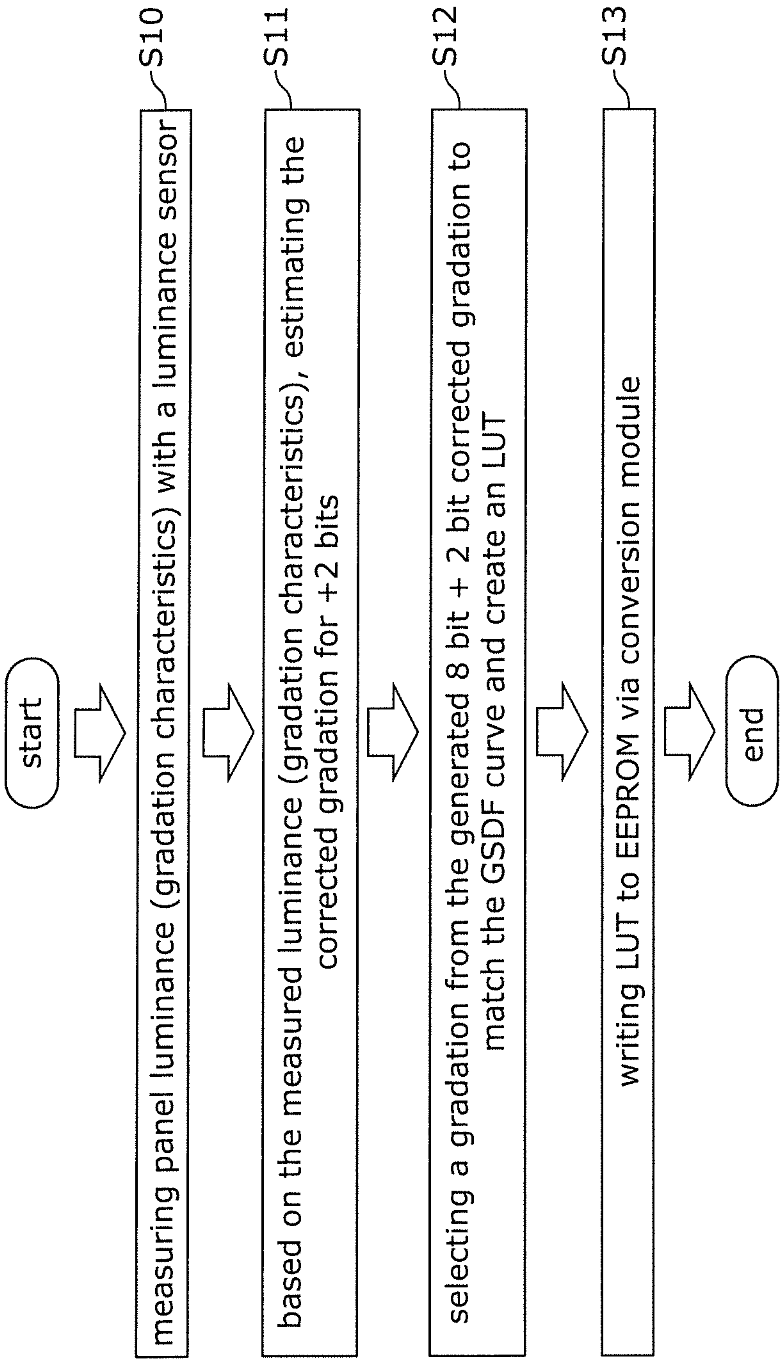
FIG. 3 is a flowchart illustrating an operation of a luminance calibrator provided in the mobile terminal according to the exemplary embodiment.
Figure 4:
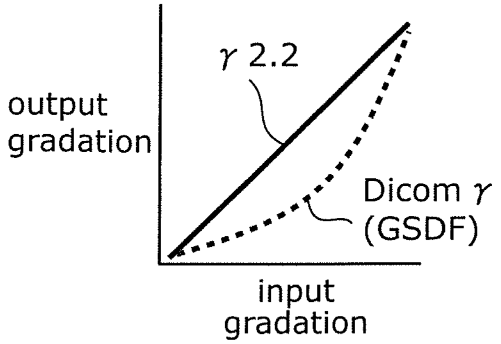
FIG. 4 is diagrams for explaining the operation of the luminance calibrator provided in the mobile terminal according to the exemplary embodiment.
Figure 4:
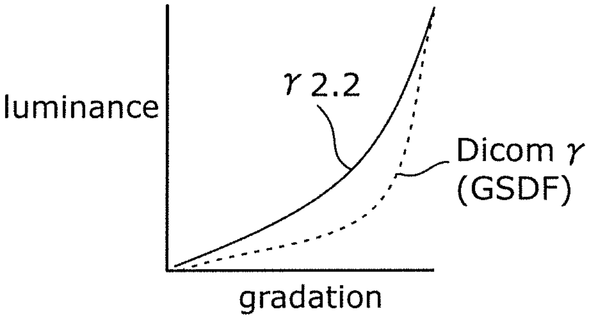

First, an operation of luminance calibrator 30*a* provided in mobile terminal 10 according to the present exemplary embodiment will be described. FIG. 3 is a flowchart illustrating the operation of luminance calibrator 30*a* provided in mobile terminal 10 according to the present exemplary embodiment. FIG. 4 is a diagram for explaining the operation of luminance calibrator 30*a* provided in mobile terminal 10 according to the present exemplary embodiment. Part (a) of FIG. 4 illustrates an example of a corrected gradation of 8 bits+2 bits. Part (b) of FIG. 4 illustrates an example of LUT data for GSDF. Part (c) of FIG. 4 illustrates an example of a straight line and a curve ("γ2.2" and "Dicom γ (GSDF), respectively)" illustrating relationship between an input gradation and an output gradation in parts (a) and (b) of FIG. 4. Part (d) of FIG. 4 illustrates gamma characteristics of "γ2.2" and "Dicom γ (GSDF))."

First, when terminal body 30 has shifted from the first position at which terminal body 30 exposes the front surface of display panel 22 to the second position at which terminal body 30 covers the front surface of display panel 22, namely, when mobile terminal 10 ends its use and is folded and display panel 22 and terminal body 30 come into an overlapping state, luminance calibrator 30*a* performs the luminance calibration by automatically measuring the luminance (gradation characteristic) of display panel 22 with luminance sensor 33 (luminance calibration step S10). Specifically, luminance calibrator 30*a* outputs a grayscale picture of gradations from 0 to 255 represented by 8 bits to display panel 22, measures the luminance of display panel 22 at each gradation, and records the luminance. Note that display panel 22 is adjusted in advance so as to have a gamma characteristic of γ2.2.

Subsequently, luminance calibrator 30*a* estimates a 10-bit γ2.2 corrected gradation obtained by adding 2 bits to 8 bits based on the measured luminance (gradation characteristic) (S11). Specifically, as illustrated in part (a) of FIG. 4, luminance calibrator 30*a* calculates a deviation of an 8-bit gradation characteristic obtained in the luminance calibration step S10 from the gamma characteristic of γ2.2, and calculates a 10-bit gradation ("output gradation" in part (a) of FIG. 4) corresponding to each 8-bit gradation ("input gradation" in part (a) of FIG. 4) so as to correct (eliminate) the calculated deviation. Strictly speaking, the "10-bit gradation" here is one obtained by adding three gradations between each 8-bit gradation, and is thus 1020 gradations as a whole. The calculated relationship between the input gradation and the output gradation illustrated in part (a) of FIG. 4 is, for example, a straight line (or curve) indicated by "γ2.2" in part (c) of FIG. 4. The gamma characteristic is, for example, a curve indicated by "γ2.2" in part (d) of FIG. 4.

Figure 5:
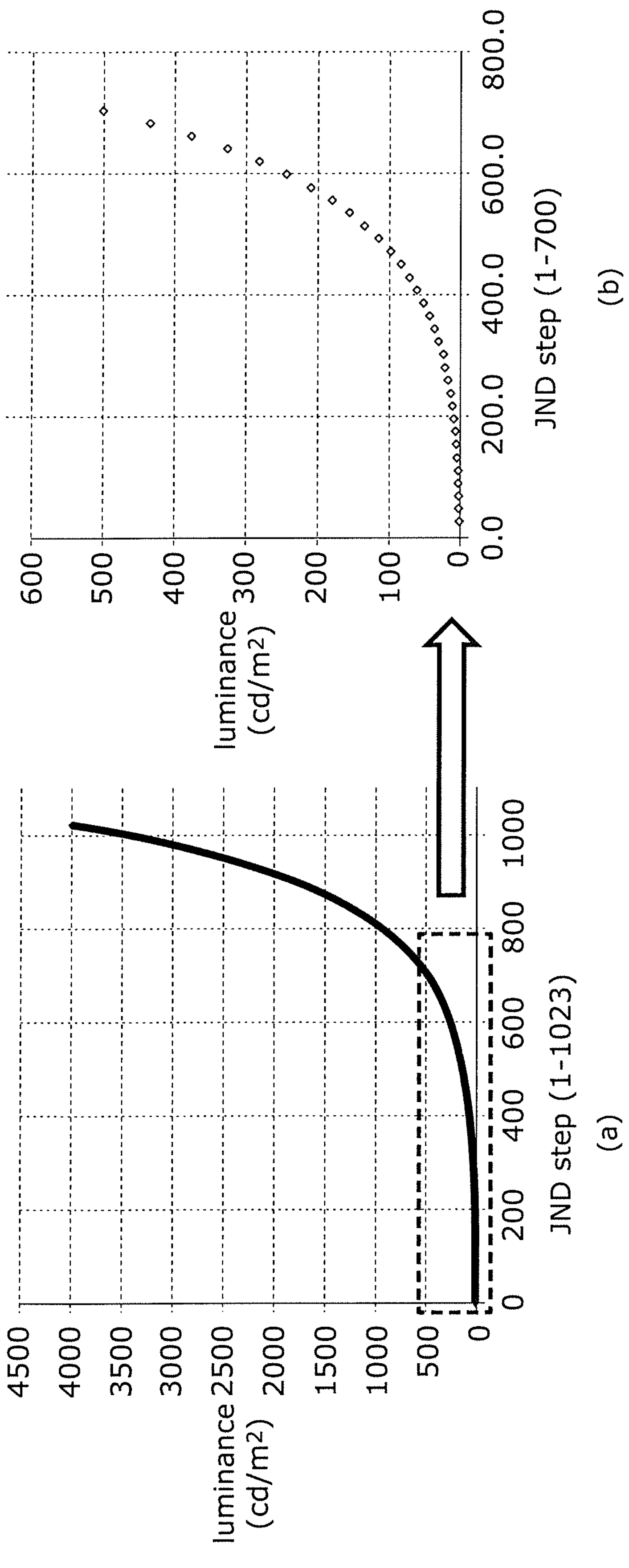
FIG. 5 is diagrams each illustrating a GSDF curve.

Subsequently, luminance calibrator 30*a* selects an output gradation that matches the GSDF curve (or DICOM curve) corresponding to each of the 8-bit input gradations from the generated 10-bit corrected gradation, to creates 10-bit digital γ (i.e., GSDF) LUT data as illustrated in part (b) of FIG. 4 (S12). The created digital γ (i.e., LUT data for GSDF) is, for example, a curve indicated by "Dicom γ (GSDF)" in part (c) of FIG. 4, and its gamma characteristic is, for example, a curve illustrated by "Dicom γ (GSDF)) in part (d) of FIG. 4. In the GSDF curve, as illustrated in FIG. 5, the luminance is determined for each just-noticeable difference (JND) (minimum discrimination threshold) step. Part (a) of FIG. 5 illustrates a GSDF curve, and part (b) of FIG. 5 is a curve obtained by enlarging a low-luminance region surrounded by a broken line in part (a) of FIG. 5. The JND step is a step when the luminance is defined as 0.05 cd/m$^2$ on a darker side and 4000 cd/m$^2$ on a brighter side focusing on the fact that a human's eyes have relatively high sensitivity in a darker region than a bright region, and it is assumed that the human can feel a luminance difference of 1023 steps between the two sides. In the GSDF curve, as illustrated in FIG. 5, the luminance is determined for each JND step. For example, a display device having a maximum luminance of 500 cd/m$^2$ needs to satisfy a luminance gradation of a portion surrounded by the broken line in part (a) of FIG. 5.

Finally, luminance calibrator 30*a* writes the created 10-bit digital γ (i.e., LUT data for GSDF) to EEPROM 21*a* via conversion module 40 (S13). Specifically, 256 pieces of 10-bit "output gradation" data illustrated in part (b) of FIG. 4 are sequentially arranged and written to EEPROM 21*a*.

In this way, when mobile terminal 10 is folded after use, the luminance calibration using luminance sensor 33 is automatically performed by luminance calibrator 30*a*, LUT data indicating gamma characteristic for GSDF which reflects a result of the luminance calibration is generated and the generated LUT data is written to EEPROM 21*a*.

Note that luminance calibrator 30*a* may perform the luminance calibration each time mobile terminal 10 is folded, may perform the luminance calibration each time mobile terminal 10 is folded a predetermined number of times, or may perform the luminance calibration when a predetermined period (e.g., 10 days) elapses and mobile terminal 10 is folded.

Figure 6:
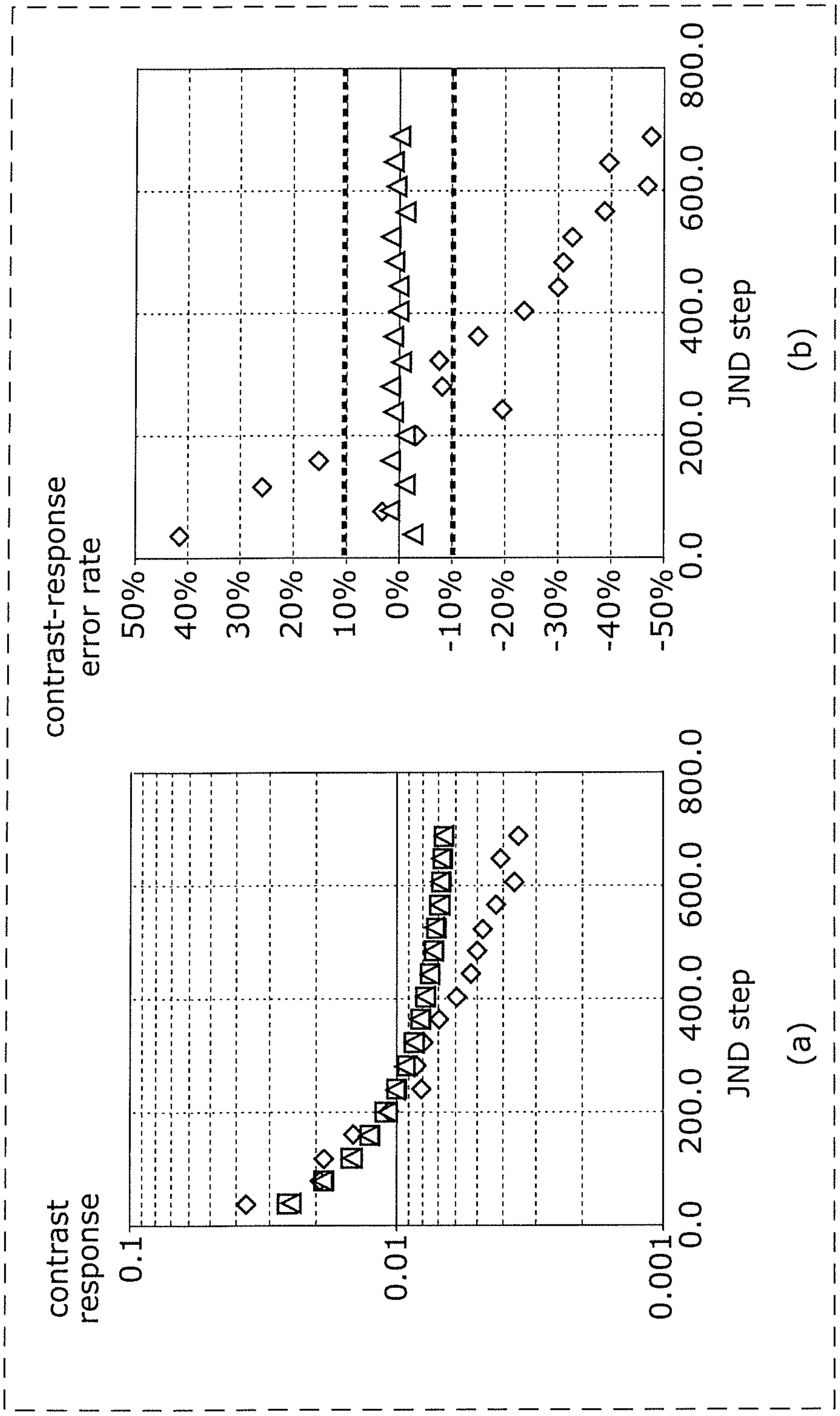
FIG. 6 is diagrams illustrating examples of a contrast response and a contrast-response error rate in display using look-up table (LUT) data for GSDF generated by the luminance calibrator provided in the mobile terminal according to the exemplary embodiment.

FIG. 6 is a diagram illustrating an example of each of a contrast response (part (a) of FIG. 6) and a contrast-response error rate (part (b) of FIG. 6) in display using LUT data for GSDF generated by luminance calibrator 30*a* provided in mobile terminal 10 according to the exemplary embodiment. In parts (a) and (b) of FIG. 6, a horizontal axis represents a JND step. In part (a) of FIG. 6, a square plot represents a contrast response calculated from an ideal GSDF. In parts (a) and (b) of FIG. 6, rhombic plots respectively represent a contrast response and a contrast response error in display using no LUT data for GSDF (i.e., display in accordance with to γ2.2). In parts (a) and (b) of FIG. 6, triangular plots respectively represent a contrast response and a contrast response error in display using LUT data for GSDF.

A contrast response $\delta_{in}$ is an index for evaluating a degree compliant with GSDF, and is a contrast (i.e., luminance difference/average luminance) for each JND unit index, as illustrated in Expression 1 below. The gradations to be evaluated are among gradations of 1 to 18.

[Equation 1]

$$\delta_{in} = \frac{L_{in+1} - L_{in}}{\left(\frac{L_{in+1} + L_{in}}{2}\right) \cdot (J_{in+1} - J_{in})} \quad \text{(Equation 1)}$$

where $J_{in}$ and $J_{in+1}$ are adjacent JND indexes. $L_{in}$ and $L_{in+1}$ are the luminances with the JND indexes at the gradations of $J_{in}$ and $J_{in+1}$, respectively. Therefore, a numerator $(L_{in+1} - L_{in})$ in Equation 1 is a luminance difference between adjacent gradations. $(L_{in+1}+L_{in})/2$ in a denominator of Expression 1 is a luminance average of adjacent gradations.

A contrast response error $K_\delta$ is an error rate (maximum error rate (%)) between a contrast response $\delta_n$ calculated from an ideal GSDF and a contrast response $\delta_{in}$ obtained by the measurement, as illustrated in Equation 2 below.

$$K_\delta = (\delta_n - \delta_{in})/\delta_{in} * 100 \quad \text{(Equation 2)}$$

As can be seen from the rhombic plots in FIGS. 6(*a*) and (*b*), in a normal display using no LUT data for GSDF (i.e., display in accordance with γ2.2), the contrast response obtained by the measurement deviates significantly from the contrast response calculated from the ideal GSDF (part (a) of FIG. 6), and the contrast response error obtained by the measurement exceeds ±10% in many JND steps (part (b) of FIG. 6).

In contrast, as can be seen from the triangular plots in parts (a) and (b) of FIG. 6, in the display according to the present exemplary embodiment using the LUT data for GSDF generated by the luminance calibrator 30*a,* the contrast response obtained by measurement is almost identical to the contrast response calculated from the ideal GSDF (part (a) of FIG. 6), and the contrast response error obtained by the measurement is within ±10% in all the JND steps.

From the above, it can be seen that in the display using the LUT data for GSDF generated by luminance calibrator 30*a,* the contrast response calculated from the ideal GSDF has been achieved.

Figure 7:
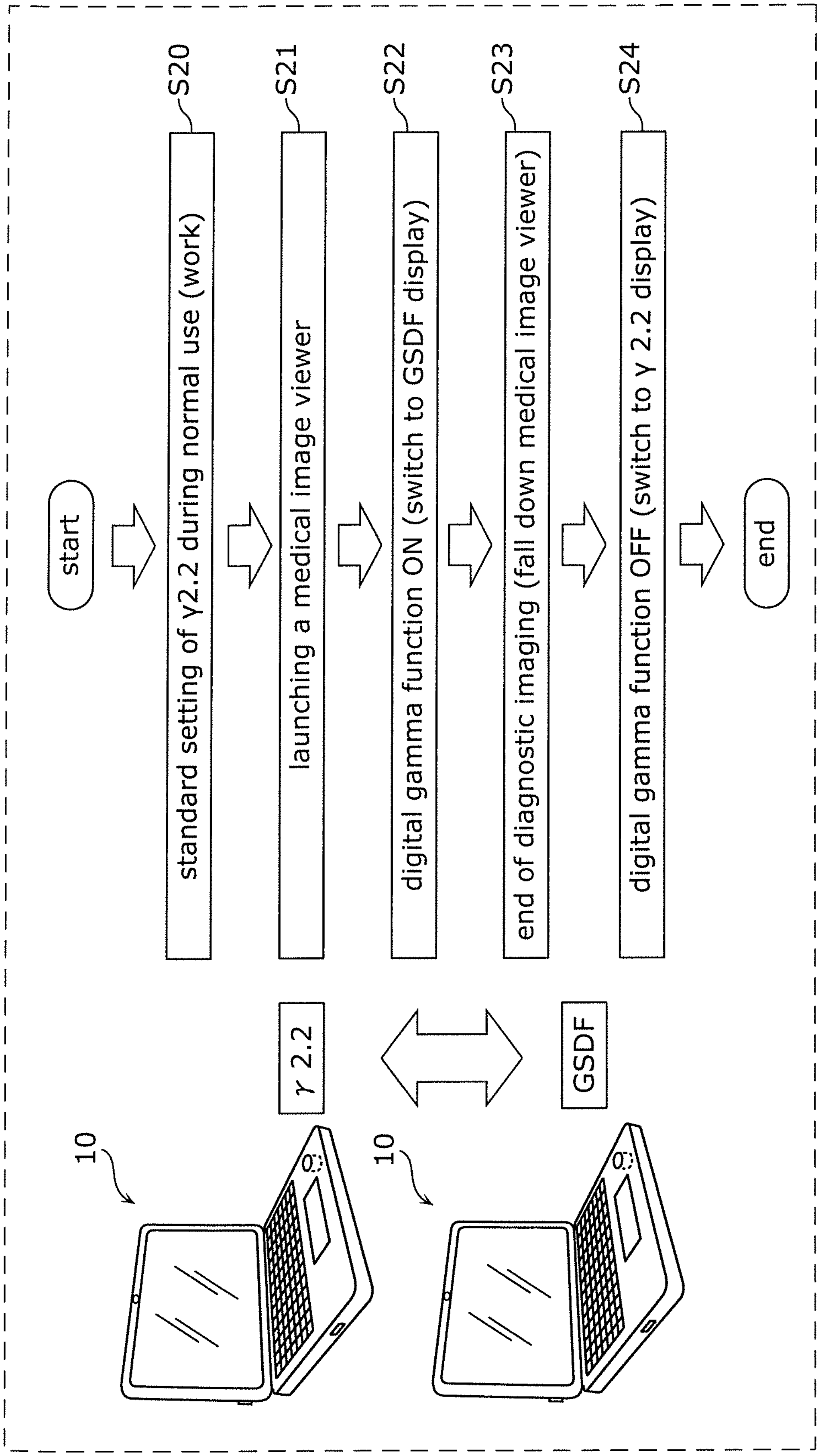
FIG. 7 is a flowchart illustrating an operation of a gamma characteristic switcher provided in a mobile terminal according to the present exemplary embodiment, and a view for explaining the operation.

Next, an operation of gamma characteristic switcher 30*c* provided in mobile terminal 10 according to the present exemplary embodiment will be described. FIG. 7 is a flowchart illustrating the operation of gamma characteristic switcher 30*c* provided in mobile terminal 10 according to the present exemplary embodiment, and a view for explaining the operation.

First, during normal use (work), mobile terminal 10 is put in a standard setting of γ2.2 of display panel 22 (S20). That is, in this state, TCON 21*b* outputs image data transmitted from terminal body 30 to display panel 22 as it is. Display panel 22 having received the image data performs gradation conversion on the image data in accordance with the internally set gamma characteristic of γ2.2 and displays the image data.

Figure 8:
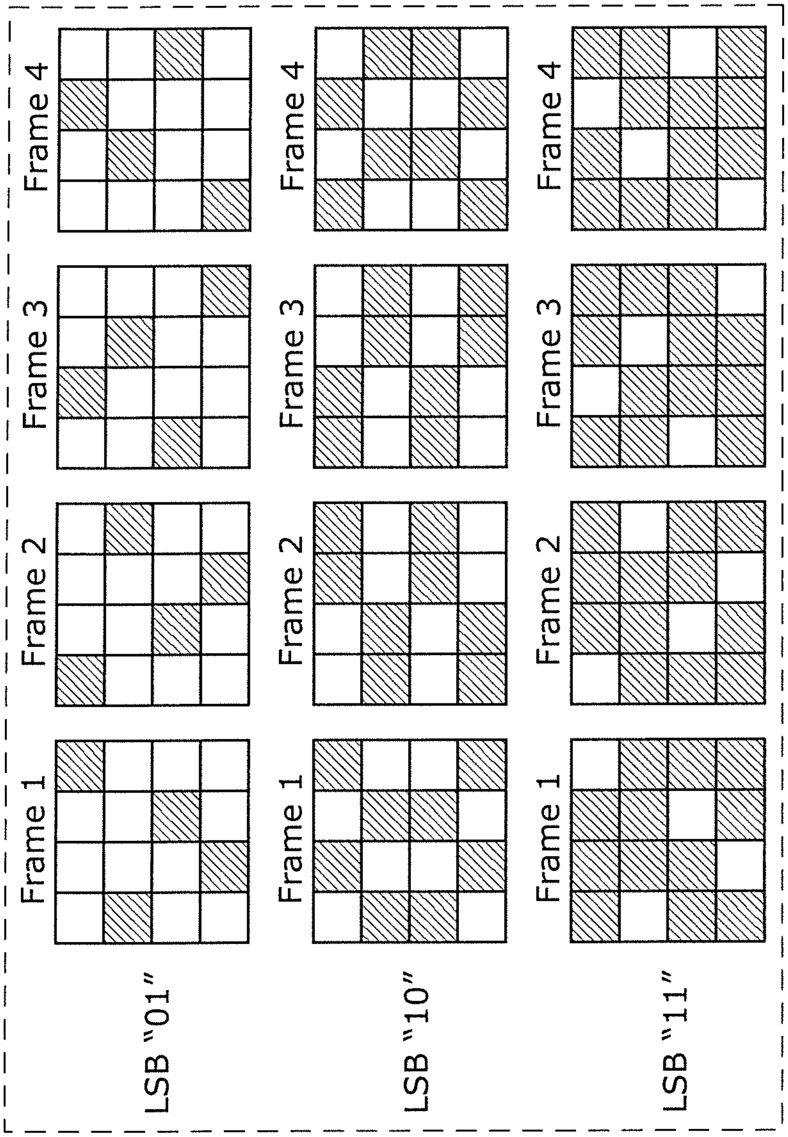
FIG. 8 is a diagram for explaining a technique for improving a gradation number by frame rate control (FRC)

Now, it is assumed that medical image viewer 30*b* has been started up by the user in mobile terminal 10 (S21 in FIG. 7). Then, in response to an instruction from medical image viewer 30*b,* gamma characteristic switcher 30*c* starts up, and gamma characteristic switcher 30*c* having started up instructs "digital γ function ON" to TCON 21*b,* thus enabling the gradation conversion in accordance with the LUT data for GSDF stored in EEPROM 21*a.* (S22 in FIG. 7). As a result, TCON 21*b* performs gradation conversion on the image data transmitted from terminal body 30 in accordance with the LUT data for GSDF held in the internal memory and having been held in EEPROM 21*a* (gradation conversion step), and display panel 22 displays the image data after the gradation conversion (display step). Specifically, TCON 21*b* obtains a 10-bit output gradation corresponding to the 8-bit image data transmitted from terminal body 30 by referring to the LUT data for GSDF held in the internal memory and having been held in EEPROM 21*a.* TCON 21*b* then calculates 8-bit image data corresponding to the acquired 10-bit output gradation by a frame rate control (FRC) method and outputs the image data to display panel 22. As illustrated in FIG. 8, FRC is a technology for improving a gradation number in which a plurality of patterns are switched for each frame corresponding to LSB2 bit of 10-bit image data, to generate three or more pseudo gradations between two gradations in 8-bit image data. Thereby, the user can interpret a medical image or perform image diagnosis in accordance with DICOM γ (i.e., compliant with GSDF).

When the image diagnosis ends and medical image viewer 30*b* is shut down by the user (S23 in FIG. 7), gamma characteristic switcher 30*c* instructs "digital γ function OFF" to TCON 21*b* with an instruction from medical image viewer 30*b* immediately before the shutdown, to stop the gradation conversion for GSDF using EEPROM 21*a* (S24 in FIG. 7). As a result, mobile terminal 10 returns to the normal use (work) state, and displays image data with the standard setting of γ2.2 of display panel 22.

Next, an operation of gamma characteristic corrector 30*d* provided in mobile terminal 10 according to the present exemplary embodiment will be described.

The visibility of a display image in a bright-place environment is affected by environmental illuminance. Specifically, a contrast ratio (bright place CR) in a bright place is expressed by Equation 3 below.

$$\text{Bright place CR} = (W + R * \text{Lum}/\pi)/(Bk + R * \text{Lum}/\pi) \quad \text{(Equation 3)}$$

where W is white luminance. Bk is black luminance. R is a reflectance of display panel 22. Lum is the environmental illuminance obtained by illuminance sensor 24.

As can be seen from Equation 3, there are methods for improving the visibility in the bright place as follows: (1) increasing white luminance W; (2) decreasing black luminance Bk; (3) reducing reflectance R; and (4) correcting LUT data for GSDF (first gamma characteristic). Gamma characteristic corrector 30*d* decreases the contrast response error by the method (4) out of the four methods, that is, by controlling TCON 21*b* so that TCON 21*b* converts the gradation of the image data by use of LUT data for GSDF corresponding to environmental illuminance Lum (a second gamma characteristic corresponding to one obtained by correcting the first gamma characteristic) while monitoring environmental illuminance Lum. That is, gamma characteristic corrector 30*d* causes the second gamma characteristic, which corresponds to one obtained by correcting the first gamma characteristic, to be used so as to cancel the contrast response error due to environmental illuminance Lum obtained by illuminance sensor 24. For example, gamma characteristic corrector 30*d* considers that the luminance of display panel 22 increases by luminance (R*Lum/π) of environmental illuminance Lum under environmental illuminance Lum, and generates a second gamma characteristic corresponding to one obtained by reducing luminance of each gradation indicated by the first gamma characteristic by (R*Lum/π), and causes the internal memory of TCON 21*b* to hold the second gamma characteristic.

Figure 9:
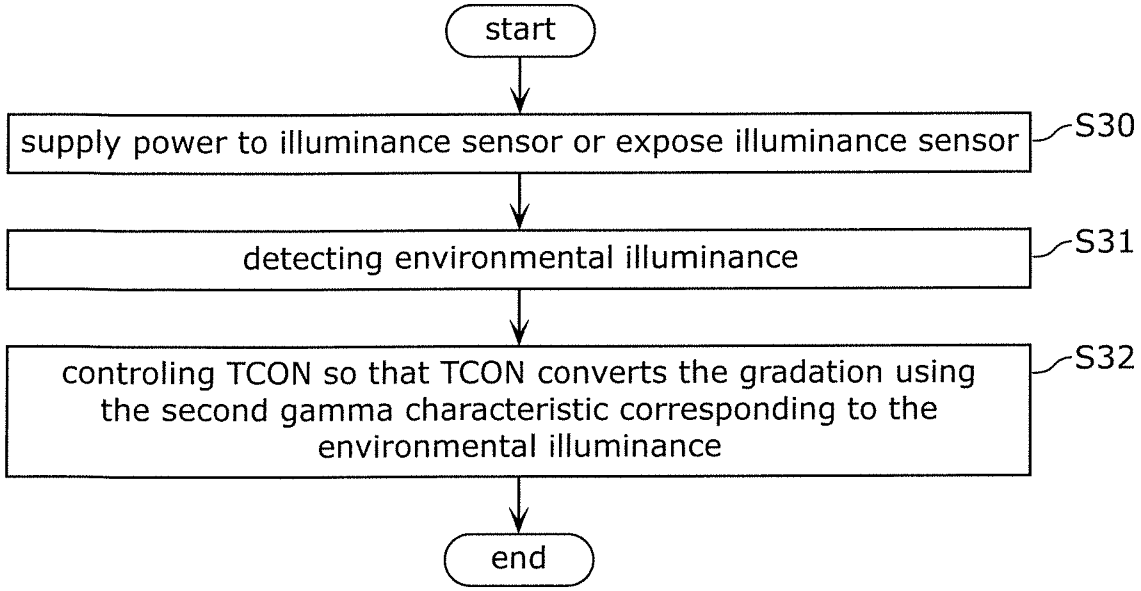
FIG. 9 is a flowchart illustrating an operation of a gamma characteristic corrector provided in the mobile terminal according to the exemplary embodiment.

FIG. 9 is a flowchart illustrating the operation of gamma characteristic corrector 30*d* provided in mobile terminal 10 according to the present exemplary embodiment.

First, when power is supplied to illuminance sensor 24, or when the structure covering illuminance sensor 24 is removed and illuminance sensor 24 is exposed (S30), gamma characteristic corrector 30*d* detects illuminance of an environment where mobile terminal 10 is placed with illuminance sensor 24 (illuminance detection step S31).

Then, gamma characteristic corrector 30*d* controls TCON 21*b* so that TCON 21*b* performs gradation conversion by use of the second gamma characteristic corresponding to the illuminance detected by illuminance sensor 24 (gamma characteristic correction step S32). One specific way of generating the second gamma characteristic is a method that TCON 21*b* generates the second gamma characteristic. That is, as the first gamma characteristics for GSDF, a plurality of first gamma characteristics for GSDF, which corresponds to cases where mobile terminal 10 is placed in a dark place and bright places with a plurality of illuminances, are held in EEPROM 21*a*. TCON 21*b* reads the first gamma characteristic corresponding to the environmental illuminance from the plurality of first gamma characteristics held in EEPROM 21*a* in accordance with the environmental illuminance output from gamma characteristic corrector 30*d*. TCON 21*b* holds the read first gamma characteristic in the internal memory as a second gamma characteristic, or generates a second gamma characteristic corresponding to the environmental illuminance by referring to a plurality of first gamma characteristics close to the environmental illuminance and holds the second gamma characteristic in the internal memory. TCON 21*b* converts the gradation of the input image data in accordance with the second gamma characteristic held in the internal memory.

Another specific way of generating the second gamma characteristic is a method that gamma characteristic corrector 30*d* generates the second gamma characteristic. Gamma characteristic corrector 30*d* holds a plurality of first gamma characteristics for GSDF corresponding to cases where the mobile terminal is placed in a dark place and bright places with a plurality of illuminances. Then, gamma characteristic corrector 30*d* reads the first gamma characteristic corresponding to the environmental illuminance from the held plurality of first gamma characteristics in accordance with the environmental illuminance detected by illuminance sensor 24. Gamma characteristic corrector 30*d* outputs the read first gamma characteristic to TCON 21*b* as a second gamma characteristic, or generates a second gamma characteristic corresponding to the environmental illuminance by referring to a plurality of first gamma characteristics close to the environmental illuminance and outputs the second gamma characteristic to TCON 21*b*. TCON 21*b* holds the second gamma characteristic output from gamma characteristic corrector 30*d* in the internal memory. TCON 21*b* converts the gradation of the input image data in accordance with the second gamma characteristic held in the internal memory.

More specifically, in any of the methods, gamma characteristic corrector 30*d* has a correlation table between a measured value of luminance on a front surface of display panel 22 and reflection luminance on a polarizing plate surface of display panel 22 at that time. For example, gamma characteristic corrector 30*d* has a correlation table of a reflection luminance of 1 cd for an environmental illuminance of 100 lx, and has a correlation table of a reflection luminance of 2 cd for an environmental illuminance of 300 lx. Then, luminance calibrator 30*a* refers to the correlation table when creating LUT data, to create a plurality of pieces of LUT data (i.e., first gamma characteristics) corresponding to the respective environmental illuminances. Hence it is possible to perform an operation of measuring the environmental illuminance and switching the LUT data to be used in accordance with a numerical value of the measurement (i.e., generating the second gamma characteristic). The above two methods exist depending on whether gamma characteristic corrector 30*d* or EEPROM 21*a* has the LUT data. Which method is adopted is determined by settings in terminal body 30. In this way, when the digital γ function is turned on, TCON 21*b* can perform gradation conversion on the image data transmitted from terminal body 30 by use of LUT data corrected in accordance with the environmental illuminance and more compliant with GSDF (gradation conversion step). Then, the image data obtained by the gradation conversion in TCON 21*b* is displayed on display panel 22 (display step).

Figure 10:
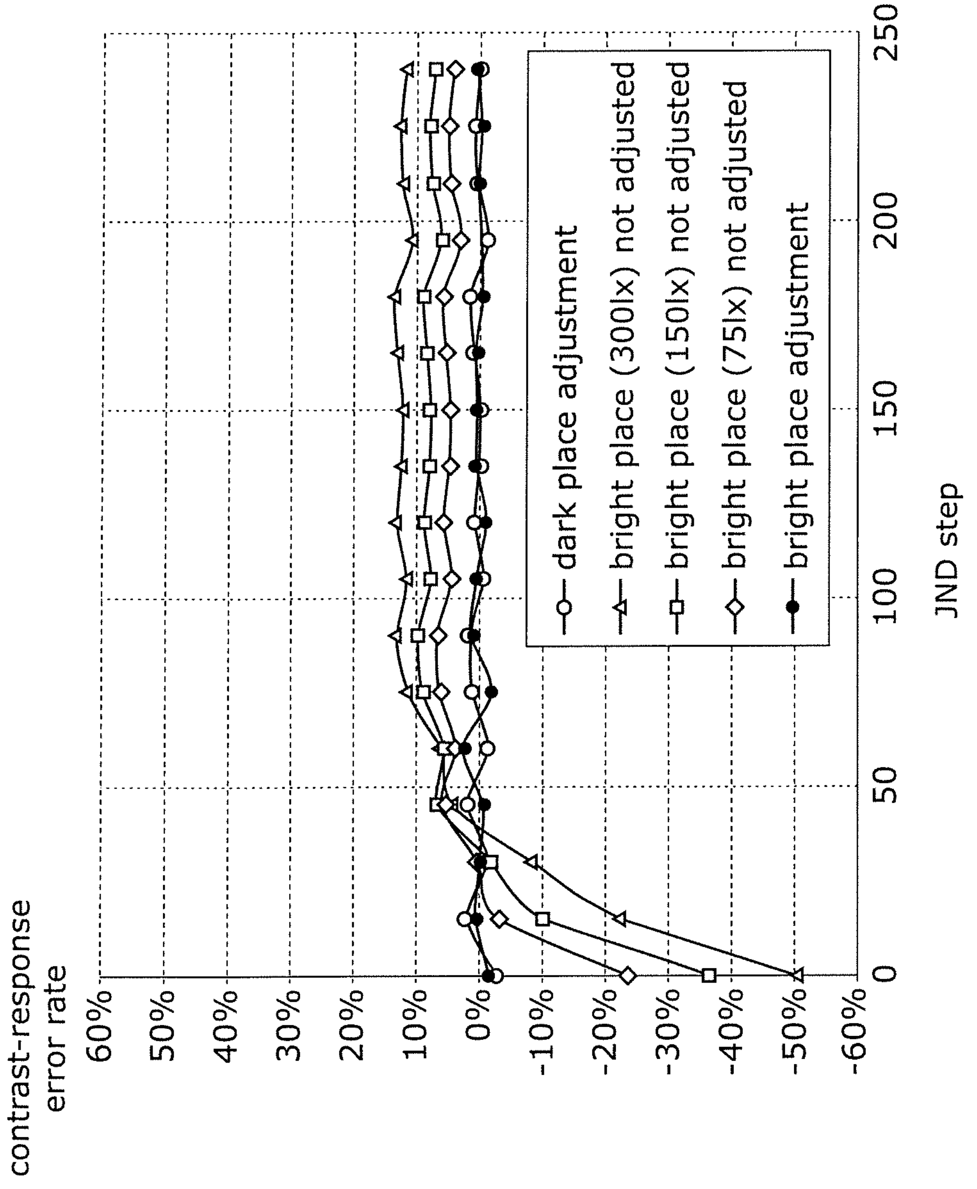
FIG. 10 is a diagram illustrating effects obtained by use of second gamma characteristics corresponding to various environmental illuminances under the control of the gamma characteristic corrector.

FIG. 10 is a diagram illustrating effects obtained by use of the second gamma characteristic corresponding to various environmental illuminances under control by gamma characteristic corrector 30*d*. Here, a horizontal axis represents the JND step, a vertical axis represents the contrast response error $K_\delta$, and pieces of data obtained by measurement under various environmental illuminances are plotted. Open circles indicate data when the first gamma characteristic is used in a dark place. Open triangles, open squares, and open diamonds indicate pieces of data when the first gamma characteristic is used in bright places with environmental illuminance of 300 lx, 150 lx, and 75 lx, respectively. Black circles illustrate data when the second gamma characteristic is used in a bright place.

As can be seen from the data when the second gamma characteristic is used in the bright place (black circle plots), under the control by gamma characteristic corrector 30*d*, the contrast response error $K_\delta$ is within 10% as in the display in the dark place. That is, a contrast response error that may occur due to environmental illuminance has been reduced by gamma characteristic corrector 30*d*, and gradation conversion has been performed using LUT data that is more compliant with GSDF.

As described above, mobile terminal 10 according to the present exemplary embodiment includes: display panel 22; and terminal body 30 as an opening and closing unit movably linked to display panel 22 so as to be able to take a first position for exposing the front surface of display panel 22 and a second position for covering the front surface of display panel 22. Terminal body 30 has at least one luminance sensor 33 that is a luminance sensor attached to the surface of terminal body 30 facing the front surface of display panel 22 when at the second position, and that detects luminance of the front surface of display panel 22.

Thereby, when terminal body 30 is at the second position, the luminance of display panel 22 can be measured by luminance sensor 33 attached to terminal body 30. As a result, when terminal body 30 shifts from the first position to the second position, that is, when mobile terminal 10 is not in use, luminance calibration can be performed, and the luminance calibration is performed with high frequency, thereby achieving a mobile terminal that can maintain a gradation characteristic suitable for displaying a medical image.

Here, terminal body 30 has keyboard 31 and touch pad 32 as input devices for receiving an instruction from the user. Thereby, mobile terminal 10 is achieved by, for example, a node PC or the like and can interact with the user.

In addition, mobile terminal 10 further includes: EEPROM 21*a* that holds the gamma characteristic; USB port 34 as an output port for outputting data; and conversion module 40 that converts data output from USB port 34 into data being able to be input into EEPROM 21*a* and writes the data to EEPROM 21*a*. Thereby, terminal body 30 can directly access EEPROM 21*a* via conversion module 40, and luminance calibrator 30*a* installed in terminal body 30 can update the LUT data stored in EEPROM 21*a*.

USB port 34 includes a USB connector as a first connector attached to the housing of mobile terminal 10, mobile terminal 10 includes connector 23 as a second connector connected to EEPROM 21*a* and attached to the housing of mobile terminal 10, and conversion module 40 is connected to the USB connector and connector 23. Thereby, conversion module 40 becomes detachable from terminal body 30, and conversion module 40 can be attached to terminal body 30 and used only when necessary.

Mobile terminal 10 further includes luminance calibrator 30*a* that generates a gamma characteristic by performing luminance calibration in accordance with luminance detected by at least one luminance sensor 33, and writes the generated gamma characteristic to EEPROM 21*a* via conversion module 40, and luminance calibrator 30*a* performs the luminance calibration when terminal body 30 shifts from the first position to the second position. Thereby, while mobile terminal 10 is not in use, luminance calibrator 30*a* can automatically perform the luminance calibration to generate a gamma characteristic, and write the gamma characteristic to EEPROM 21*a* via conversion module 40.

Further, a method for calibrating mobile terminal 10 according to the present exemplary embodiment includes luminance calibration step S10 of performing calibration of a gamma characteristic of mobile terminal 10 in accordance with the luminance detected by the at least one luminance sensor 33, and in luminance calibration step S10, the calibration is performed when terminal body 30 shifts from the first position to the second position. Thereby, the luminance calibration is automatically performed while mobile terminal 10 is not in use.

Further, mobile terminal 10 is a device for displaying image data, mobile terminal 10 including: TCON 21*b* that converts a gradation of input image data; display panel 22 that displays the image data with the gradation converted by the TCON 21*b;* illuminance sensor 24 that detects illuminance of an environment where the display device is placed; and gamma characteristic corrector 30*d* that controls TCON 21*b* so as to convert the gradation by use of a second gamma characteristic corresponding to the detected illuminance.

Thus, the gradation of the image data is converted using the second gamma characteristic corresponding to the environmental illuminance detected by illuminance sensor 24. Therefore, even under various environmental illuminances, it is possible to maintain the GSDF-compliant gradation characteristic with the contrast response error corrected, and a display device suitable for displaying a medical image on a mobile terminal is achieved.

Gamma characteristic corrector 30*d* further includes EEPROM 21*a* that holds a first gamma characteristic. Gamma characteristic corrector 30 outputs information on the illuminance detected by illuminance sensor 24 to TCON 21*b*. TCON 21*b* generates a second gamma characteristic corresponding to the environmental illuminance output from gamma characteristic corrector 30*d* by referring to the first gamma characteristic held in EEPROM 21*a,* and converts the gradation of the image data by use of the generated second gamma characteristic. Accordingly, by referring to the first gamma characteristic held in EEPROM 21*a,* TCON 21*b* can perform gradation conversion suitable for a medical image by use of the second gamma characteristic corresponding to the environmental illuminance generated.

Further, gamma characteristic corrector 30*d* generates a second gamma characteristic corresponding to the illuminance detected by illuminance sensor 24 and outputs the generated second gamma characteristic to TCON 21*b*. TCON 21*b* converts the gradation of the image data in accordance with the second gamma characteristic output from gamma characteristic corrector 30*d.* Accordingly, TCON 21*b* can perform gradation conversion suitable for a medical image by use of the second gamma characteristic output from gamma characteristic corrector 30*d.*

Display panel 22 is a panel that performs gradation conversion on image data input to display panel 22 in accordance with a gamma characteristic having a gamma value of 2.2, and displays the image data. The second gamma characteristic is a gamma characteristic having a gamma value different from 2.2. It is thus possible to perform image display suitable for a special gamma characteristic such as GSDF by use of display panel 22 having a standard gamma characteristic.

The second gamma characteristic is a gamma characteristic that defines correspondence between the gradation indicated by the input image data and the luminance of display panel 22. The second gamma characteristic is a gamma characteristic for correcting the gamma characteristic of display panel 22 so as to reduce the influence of the illuminance detected by illuminance sensor 24 on contrast of display panel 22. Accordingly, the second gamma characteristic for correcting the gamma characteristic of display panel 22 is generated by gamma characteristic corrector 30*d* so as to keep the contrast-response error rate within a certain range even under various environmental illuminances, and the second gamma characteristic is transmitted to TCON 21*b,* so that it is possible to maintain the gradation characteristic compliant with GSDF.

When power is supplied to illuminance sensor 24, or when a structure covering illuminance sensor 24 is removed and illuminance sensor 24 is exposed, gamma characteristic corrector 30*d* controls TCON 21*b* so as to convert the gradation by use of the second gamma characteristic corresponding to the environmental illuminance detected by illuminance sensor 24. This makes it possible to automatically generate a gamma characteristic with which the influence of the environmental illuminance is reduced, and maintaining the gradation characteristic compliant with GSDF is achieved even under various environmental illuminances.

Further, mobile terminal 10 includes: EEPROM 21*a* that holds the first gamma characteristic; and gamma characteristic switcher 30*c* that controls switching of TCON 21*b* between converting and outputting the gradation of the image data by referring to the first gamma characteristic and outputting the gradation of the image data without the conversion.

Thereby, the display can be switched so that the image data is displayed with the standard setting of γ2.2 of display panel 22 or the medical image is displayed in accordance with DICOM γ (i.e., compliant with GSDF).

Further, a method for displaying image data according to the present exemplary embodiment includes: a gradation conversion step of converting a gradation of the image data input into mobile terminal 10; a display step of displaying the image data with the gradation converted in the gradation conversion step; an illuminance detection step S31 of detecting illuminance of an environment where mobile terminal 10 is placed; and a gamma characteristic correction step S32 of performing control so as to convert the gradation by use of a second gamma characteristic corresponding to the detected illuminance.

Thus, the gradation of the image data is converted using the second gamma characteristic corresponding to the environmental illuminance detected by illuminance sensor 24. Therefore, even under various environmental illuminance, it is possible to reduce the contrast response error and maintain the gradation characteristic compliant with GSDF, and the display device suitable for displaying a medical image on the mobile terminal is achieved.

Figure 11:
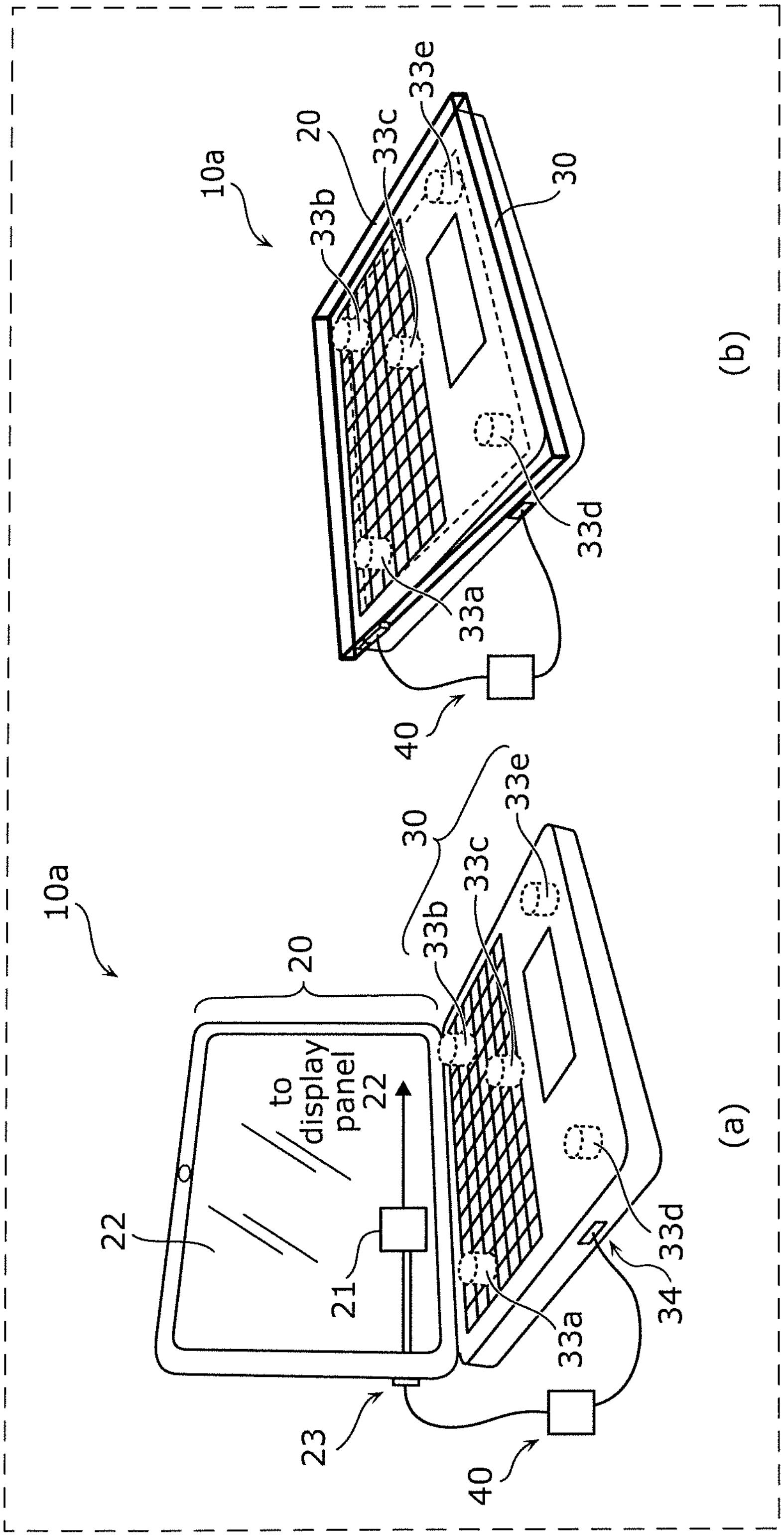
FIG. 11 is external views of a mobile terminal according to Modification 1 of the exemplary embodiment.

FIG. 11 is an external view of mobile terminal 10*a* according to Modification 1 of the exemplary embodiment. Part (a) of FIG. 11 illustrates appearance of mobile terminal 10*a* in a use state, and part (b) of FIG. 11 illustrates the appearance of mobile terminal 10*a* in a folded state. Mobile terminal 10*a* basically has the same configuration as mobile terminal 10 according to the exemplary embodiment. However, mobile terminal 10*a* is different in including five luminance sensors 33*a* to 33*e* from mobile terminal 10 that includes only one luminance sensor 33. Hereinafter, points different from the exemplary embodiment will be mainly described.

All of five luminance sensors 33*a* to 33*e* are sensors that are attached to a surface of terminal body 30 facing the front of display panel 22 when terminal body 30 as the opening and closing unit is at the second position, and detect the luminance of the front surface of display panel 22. Luminance sensors 33*a* to 33*e* are, for example, photodiodes. Specifically, three luminance sensors 33*a* to 33*c* out of five luminance sensors 33*a* to 33*e* are embedded immediately below keyboard 31, and when mobile terminal 10*a* is folded, each of three luminance sensors 33*a* to 33*c* detects the luminance of display panel 22 from a gap between keys constituting keyboard 31. Two luminance sensors 33*d* and 33*e* are embedded in a top surface of the housing of terminal body 30.

In the present modification, when terminal body 30 shifts from the first position to the second position, luminance calibrator 30*a* generates LUT data indicating a gamma characteristic for GSDF by performing luminance calibration in accordance with the luminance of display panel 22 detected by five luminance sensors 33*a* to 33*e*, and writes the generated LUT data to EEPROM 21*a* via conversion module 40. At this time, luminance calibrator 30*a* outputs a grayscale picture of gradations from 0 to 255 represented by 8 bits to display panel 22, and records an average value of the luminance of display panel 22 detected by five luminance sensors 33*a* to 33*e* in each gradation. Thereafter, in the same manner as in the exemplary embodiment, estimation of a corrected gradation, creation of LUT data for GSDF, and writing to EEPROM 21*a* are performed.

As described above, in the present modification, terminal body 30 has the plurality of luminance sensors 33*a* to 33*e*. Hence the luminance is detected at a plurality of locations on display panel 22, so that it is possible to perform highly accurate luminance calibration in consideration of spatial luminance unevenness of display panel 22.

Figure 12:
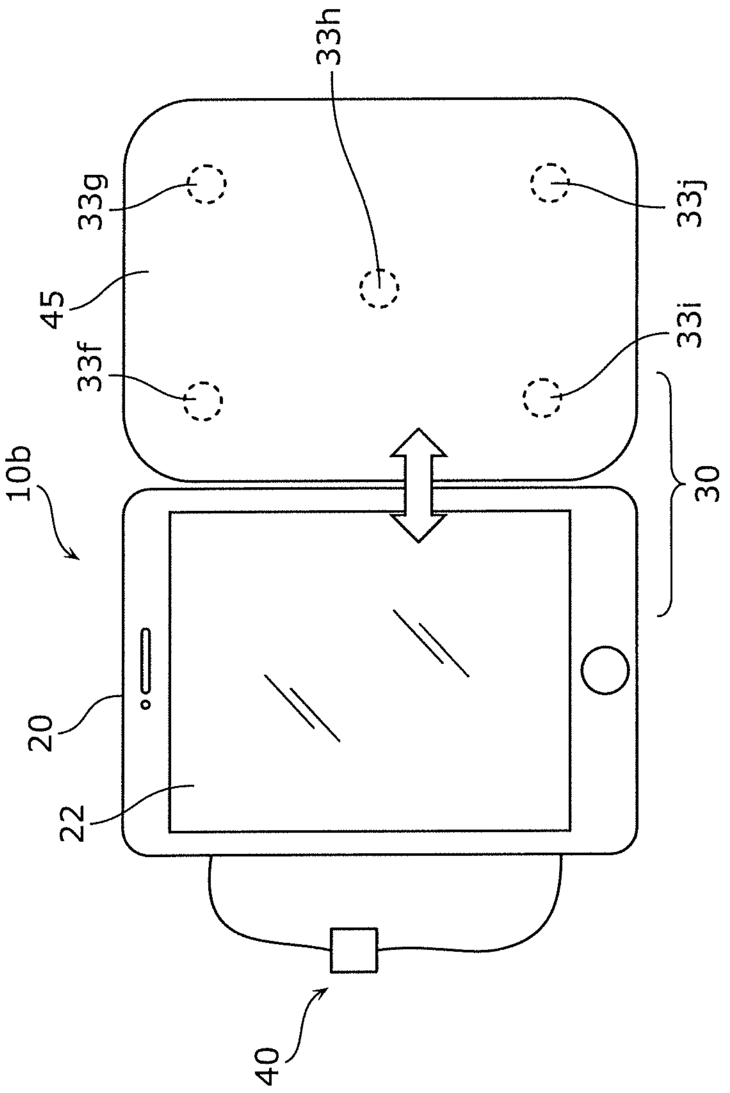
FIG. 12 is an external view of a mobile terminal according to Modification 2 of the exemplary embodiment.

FIG. 12 is an external view of mobile terminal 10*b* according to Modification 2 of the exemplary embodiment. Mobile terminal 10*b* is made up of display 20, terminal body 30, and conversion module 40 that are achieved based on a tablet computer.

Terminal body 30 includes cover 45 as an opening and closing unit movably linked to display panel 22 so as to be able to take a first position for exposing the front surface of display panel 22 and a second position for covering the front surface of display panel 22, and includes five luminance sensors 33*f* to 33*j* that are sensors attached so as to be embedded in a surface of cover 45 facing the front surface of display panel 22 when at the second position, and detect luminance of the front surface of display panel 22.

Five luminance sensors 33*f* to 33*j* are used for the same purpose as five luminance sensors 33*a* to 33*e* in Modification 1 of the exemplary embodiment. Note that mobile terminal 10*b* according to the present modification basically has the same configuration as that of mobile terminal 10*a* according to Modification 1 of the above exemplary embodiment.

As described above, in mobile terminal 10*b* according to the present modification, the opening and closing unit is cover 45 that covers the front surface of display panel 22 when at the second position. Thereby, mobile terminal 10*b* can be achieved based on the tablet computer.

As described above, the display device, the method for displaying image data, the mobile terminal, and the calibration method thereof according to the present disclosure have been described based on the exemplary embodiment and the modifications. However, the present disclosure is not limited to the embodiment and the modifications. One obtained by applying various modifications conceived by those skilled in the art to the present exemplary embodiment and modifications, as well as another form constructed by combining some constituent elements in the exemplary embodiment and modifications, is also included within the scope of the present disclosure unless departing from the gist of the present disclosure.

For example, in the above exemplary embodiment and the like, conversion module 40 has been externally attached to mobile terminal 10, but may be built in mobile terminal 10.

In the above exemplary embodiment and the like, mobile terminal 10 has been illustrated as an example of a display device that displays image data such as a medical image, but is not limited thereto. The display device may be a stationary display device, or may be achieved as a dedicated display device different from the node PC and the tablet computer.

The mobile terminal according to each of Modifications 1 and 2 of the above exemplary embodiment has five luminance sensors, but may have another number of luminance sensors. Further, the luminance sensor is not limited to a photodiode but may be an image sensor.

In the above exemplary embodiment and the like, illuminance sensor 24 has been incorporated in mobile terminal 10, but may be of a type that is externally attached to mobile terminal 10. Similarly, in the above exemplary embodiment and the like, all the luminance sensors have been incorporated in mobile terminal 10, but a type external to mobile terminal 10 may be used additionally.

Further, in the above exemplary embodiment and the like, conversion module 40 has controlled display control circuit 21, but in addition to this, conversion module 40 may control a light-emitting diode (LED) driver that drives a backlight unit included in display panel 22. Specifically, wiring for connecting control board 40*c* and the LED driver via connector 23 is provided. This makes it possible to directly control the backlight unit from terminal body 30 via conversion module 40.

The display device and the mobile terminal according to the present disclosure can be used as a display device and a mobile terminal suitable for displaying a medical image, for example, as a device that displays a medical image with a gradation characteristic determined by GSDF defined in the DICOM standard.

What is claimed is:

1. A display device comprising:

a gradation conversion circuit that converts a gradation of input image data;

a display panel that displays image data with the gradation converted by the gradation conversion circuit;

an illuminance sensor that detects illuminance of an environment where the display device is placed;

a gamma characteristic corrector that controls a gradation conversion circuit so as to convert the gradation by use of a gamma characteristic corresponding to the detected illuminance; and a storage circuit that holds a first gamma characteristic, wherein the gamma characteristic corrector outputs information on the illuminance detected by the illuminance sensor to the gradation conversion circuit, and the gradation conversion circuit generates a second gamma characteristic corresponding to the illuminance output from the gamma characteristic corrector by referring to the first gamma characteristic held in the storage circuit, and converts the gradation of the image data by use of the generated second gamma characteristic.

2. The display device according to claim 1, wherein the display panel is a panel that performs gradation conversion on image data input to the display panel in accordance with a gamma characteristic having a gamma value of 2.2, and displays the image data, and the second gamma characteristic is a gamma characteristic having a gamma value different from 2.2.

3. The display device according to claim 1, wherein the second gamma characteristic is a gamma characteristic that defines correspondence between gradation indicated by the input image data and luminance of the display panel, and the second gamma characteristic is a gamma characteristic for correcting a gamma characteristic of the display panel so as to reduce the influence of the illuminance detected by the illuminance sensor on contrast of the display panel.

4. The display device according to claim 1, wherein when power is supplied to the illuminance sensor, or when a structure covering the illuminance sensor is removed and the illuminance sensor is exposed, the gamma characteristic corrector controls the gradation conversion circuit so as to convert the gradation by use of a gamma characteristic corresponding to the illuminance.

5. A display device comprising:

a gradation conversion circuit that converts a gradation of input image data;

a display panel that displays image data with the gradation converted by the gradation conversion circuit;

an illuminance sensor that detects illuminance of an environment where the display device is placed; and a gamma characteristic corrector that controls a gradation conversion circuit so as to convert the gradation by use of a gamma characteristic corresponding to the detected illuminance, wherein the gamma characteristic corrector generates a second gamma characteristic corresponding to the illuminance detected by the illuminance sensor, and outputs the generated second gamma characteristic to the gradation conversion circuit, and the gradation conversion circuit converts the gradation of the image data in accordance with the second gamma characteristic output from the gamma characteristic corrector.

6. The display device according to claim 5, wherein when power is supplied to the illuminance sensor, or when a structure covering the illuminance sensor is removed and the illuminance sensor is exposed, the gamma characteristic corrector controls the gradation conversion circuit so as to convert the gradation by use of a gamma characteristic corresponding to the illuminance.

7. A display device comprising:

a gradation conversion circuit that converts a gradation of input image data;

a display panel that displays image data with the gradation converted by the gradation conversion circuit;

an illuminance sensor that detects illuminance of an environment where the display device is placed;

a gamma characteristic corrector that controls a gradation conversion circuit so as to convert the gradation by use of a gamma characteristic corresponding to the detected illuminance;

a storage circuit that holds the first gamma characteristic; and a gamma characteristic switcher that controls switching of the gradation conversion circuit between converting and outputting the gradation of the image data by referring to the first gamma characteristic and outputting the gradation of the image data without the conversion.

* * * * *